United States Patent
Berk et al.

(10) Patent No.: US 10,375,185 B2
(45) Date of Patent: *Aug. 6, 2019

(54) WEBSITE CREATION FROM LOCATION AND COMMUNICATION DATA

(71) Applicant: Go Daddy Operating Company, LLC, Scottsdale, AZ (US)

(72) Inventors: Josh Berk, Scottsdale, AZ (US); Justin Tsai, San Francisco, CA (US)

(73) Assignee: GO DADDY OPERATING COMPANY, LLC, Scottsdale, AZ (US)

( * ) Notice: Subject to any disclaimer, the term of this patent is extended or adjusted under 35 U.S.C. 154(b) by 549 days.

This patent is subject to a terminal disclaimer.

(21) Appl. No.: 14/951,228

(22) Filed: Nov. 24, 2015

(65) Prior Publication Data

US 2017/0149862 A1    May 25, 2017

(51) Int. Cl.
| | |
|---|---|
| G06F 15/16 | (2006.01) |
| H04L 29/08 | (2006.01) |
| H04W 4/02 | (2018.01) |
| G06Q 10/10 | (2012.01) |
| G06Q 30/02 | (2012.01) |
| G06F 16/9537 | (2019.01) |

(52) U.S. Cl.
CPC .......... *H04L 67/22* (2013.01); *G06F 16/9537* (2019.01); *G06Q 10/1093* (2013.01); *G06Q 30/02* (2013.01); *H04W 4/02* (2013.01)

(58) Field of Classification Search
CPC ......... H04L 67/06; H04L 67/22; H04L 29/08; H04W 4/02
See application file for complete search history.

(56) References Cited

U.S. PATENT DOCUMENTS

| 7,386,490 B2 * | 6/2008 | Barritz .................. G06Q 30/06 705/27.1 |
| 9,080,735 B1 * | 7/2015 | Cameron ................ F21L 4/025 |
| 9,286,273 B1 * | 3/2016 | Bobykin ............. G06F 17/2247 |
| 9,665,548 B2 * | 5/2017 | Tomiyama .......... G06F 17/2247 |
| 2005/0096982 A1 | 5/2005 | Morton et al. |
| 2008/0288338 A1 * | 11/2008 | Wiseman .............. G06Q 30/02 705/14.69 |
| 2008/0313260 A1 * | 12/2008 | Sweet ................. G06F 17/3089 709/201 |

(Continued)

FOREIGN PATENT DOCUMENTS

CN    103902296 A   *   7/2014

*Primary Examiner* — Benjamin M Thieu
(74) *Attorney, Agent, or Firm* — Quarles and Brady LLP

(57) ABSTRACT

Systems and methods of the present invention provide for one or more server computers communicatively coupled to a network and configured to: receive, from an app running on a mobile device determined to be operating in a business mode, an incoming data; display, on the mobile device, a request for, and a confirmation that the incoming data comprises a website content and its description; generate a metadata from the description defining at least one detail of the website content; define, within a data record storing the incoming data, the website content and the metadata defining one or more details of the website content; determine that a quantity of the website content is above a required threshold to generate the website; and generate the website comprising the website content.

17 Claims, 13 Drawing Sheets

(56) References Cited

U.S. PATENT DOCUMENTS

| | | | |
|---|---|---|---|
| 2009/0280783 A1* | 11/2009 | Klassen | G06F 17/3089 |
| | | | 455/414.1 |
| 2010/0017703 A1* | 1/2010 | Glickman, Jr. | G06F 17/3089 |
| | | | 715/234 |
| 2011/0047182 A1* | 2/2011 | Shepherd | G06Q 10/10 |
| | | | 707/780 |
| 2013/0091029 A1* | 4/2013 | George | G06Q 20/12 |
| | | | 705/21 |
| 2013/0159234 A1 | 6/2013 | Xing et al. | |
| 2014/0032289 A1 | 1/2014 | Huhem | |
| 2014/0136949 A1 | 5/2014 | Wang | |
| 2014/0149845 A1* | 5/2014 | Ansel | G06F 17/30705 |
| | | | 715/234 |
| 2014/0233913 A1 | 8/2014 | Scharer, III | |
| 2014/0304622 A1* | 10/2014 | Jorasch | H04L 12/1813 |
| | | | 715/753 |
| 2015/0168162 A1* | 6/2015 | Subramanian | G01C 21/28 |
| | | | 701/523 |
| 2016/0232141 A1* | 8/2016 | Fischer | G06F 17/2247 |
| 2016/0366545 A1* | 12/2016 | Yamasaki | H04W 4/02 |
| 2017/0060872 A1* | 3/2017 | Sacheti | G06F 17/3053 |

* cited by examiner

```
File  Edit  Tools          ⇐ ⇒
```

User Control Panel for Current User

Select work mode: | Active  ▽ |
                  | Inactive   |

The location software on your device shows that you have arrived at 123 Business Drive.

According to our records, this address is stored in your contacts, and you have arrived at 123 Business Drive and activated work mode at 8:00 AM Monday-Friday this week. You then deactivated work mode and departed at 5:00 PM.

Is 123 Business Drive a work related address?  | Yes  ▽ |
                                                    | No     |

According to our records, your automatically generated website has not met the required content threshold for Business Address or Availability Hours.

Would you like to set: Business Address to 123 Business Drive and Availability Hours to Monday-Friday 8:00 AM-5:00 PM? | Yes  ▽ |
                                                                                                                                       | No     |

Congratulations! Business Address and Availability Hours now have 100% of the required content.

Please note the additional status of content data and required thresholds below:
Product Details: 40% (80% Required)        Customer Testimonials: 60% (90% Required)

FIG. 8

File  Edit  Tools

User Control Panel for Current User

Select work mode:  [ Active  ▽ ]

The camera software on your device shows that you have taken a picture at 123 Business Drive. The email software on your device also shows that you received an email with an image attachment from vendor@vendorbusiness.com.

According to our records, you have marked all pictures taken at 123 Business Drive, and all emails from vendor@vendorbusiness.com as work-related. Please check the box to have all future pictures taken at this address and emails received from this email address, as well as any product descriptions, stored as website content  [ x ]

If the incoming images are product-related, please provide a product description and price:

[ Product Description ]   $ [ 99.99 ]

Congratulations! Product Catalog now has 100% of the required content.

Please note the additional status of content data and required thresholds below:
Customer Testimonials: 60% (90% Required)

FIG. 13

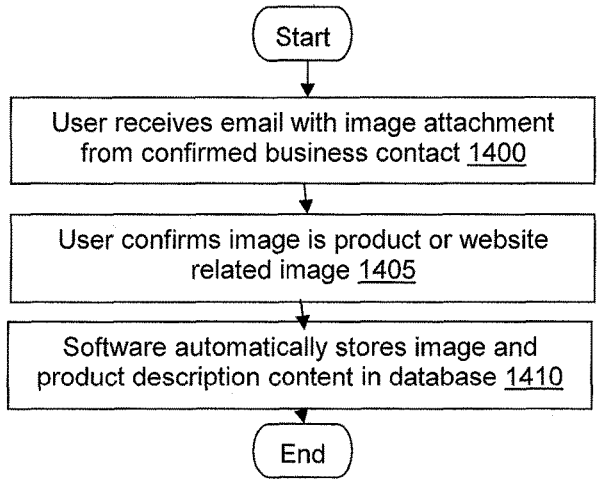

FIG. 14

WEBSITE CREATION FROM LOCATION AND COMMUNICATION DATA

FIELD OF THE INVENTION

The present invention generally relates to the field of website design and is specifically related to automatically generating and customizing a website and recommending marketing strategies based on data input by a variety of software modules (e.g., location, contact, phone, email, calendar, audio, video, etc.) running on a user's mobile device.

SUMMARY OF THE INVENTION

The present invention provides systems and methods comprising one or more server computers communicatively coupled to a network and configured to: receive, from an app running on a mobile device determined to be operating in a business mode, an incoming data; display, on the mobile device, a request for, and a confirmation that the incoming data comprises a website content and its description; generate a metadata from the description defining at least one detail of the website content; define, within a data record storing the incoming data, the website content and the metadata defining one or more details of the website content; determine that a quantity of the website content is above a required threshold to generate the website; and generate the website comprising the website content.

In another embodiment, The present invention provides systems and methods comprising one or more server computers communicatively coupled to a network and configured to: receive, from a contact list app running on a mobile device determined to be operating in a business mode, at least one incoming contact data correlated with the contact list; display, on the mobile device, a request for, and a confirmation that the incoming contact data is a business-related contact data; display, on the mobile device, a request for and confirmation that the incoming contact data is a business-related contact data; generate a marketing strategy specific to the incoming contact data; and transmit the marketing strategy to the mobile device for display.

The above features and advantages of the present invention will be better understood from the following detailed description taken in conjunction with the accompanying drawings.

BRIEF DESCRIPTION OF THE DRAWINGS

FIG. 8 is an example embodiment of a user interface used in generating and customizing a website and recommending marketing strategies according to data received by a mobile device.

FIG. 13 is an example embodiment of a user interface used in generating and customizing a website and recommending marketing strategies according to data received by a mobile device.

FIG. 14 illustrates a flow diagram for generating and customizing a website and recommending marketing strategies according to data received by a mobile device.

DETAILED DESCRIPTION

Figure 1:
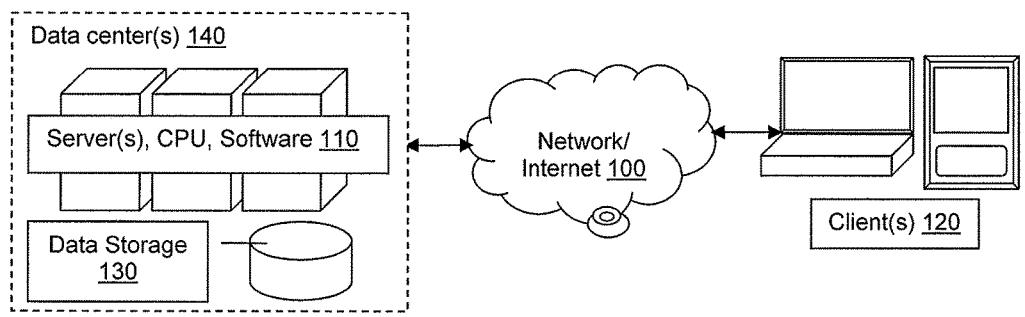
FIG. 1 illustrates a possible system for generating and customizing a website and recommending marketing strategies according to data received by a mobile device.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet comprises a vast number of computers and computer networks that are interconnected through communication links. The interconnected computers exchange information using various services. In particular, a server computer system, referred to herein as a web server, may connect through the Internet to a remote client computer system and may send, to the remote client computer system upon request, one or more websites containing one or more graphical and textual web pages of information. A request is made to the web server by visiting the website's address, known as a Uniform Resource Locator ("URL"). Upon receipt, the requesting device can display the web pages. The request and display of the websites are typically conducted using a browser. A browser is a special-purpose application program that effects the requesting of web pages and the displaying of web pages.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A URL is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. Otherwise, the Internet user may keep selecting alternative domain names until an available domain name is found. Domain names are typically registered for a period of one to ten years with first rights to continually re-register the domain name.

The information on web pages is in the form of programmed source code that the browser interprets to determine what to display on the requesting device. The source code may include document formats, objects, parameters, positioning instructions, and other code that is defined in one or more web programming or markup languages. One web programming language is HyperText Markup Language ("HTML"), and all web pages use it to some extent. HTML uses text indicators called tags to provide interpretation instructions to the browser. The tags specify the composition of design elements such as text, images, shapes, hyperlinks to other web pages, programming objects such as JAVA applets, form fields, tables, and other elements. The web page can be formatted for proper display on computer systems with widely varying display parameters, due to differences in screen size, resolution, processing power, and maximum download speeds.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other. However, presently-existing systems and methods for designing and launching a website require a user wishing to establish an online presence to navigate through a complicated series of steps to do so. First, the owner must register a domain name. The owner must then design a website, or hire a website design company to design the website. Then, the owner must purchase, configure, and implement website-related services, including storage space and record configuration on a web server, software applications to add functionality to his website, maintenance and customer service plans, and the like. This process can be complicated, time-consuming, and fraught with opportunity for user error. It may also be very expensive to produce, serve, and maintain the user's website. Merchants may be hesitant to create an online presence because of the perceived effort involved to do so. These merchants limit their business to offline "brick and mortar" points of sale.

Some existing website design approaches can simplify the design process through automation of certain of the design process steps. Typically, a user is provided a template comprising a fully or substantially hard-coded framework. The user must then customize the framework by providing content, such as images, descriptive text, web page titles and internal organizational links between web pages, and element layout choices. While the resulting website may be customized to the user's preferences and may present the desired information, the design process remains complicated and time-consuming because the user must identify, locate, prepare, and upload all of the desired content and then organize it within the web pages of the website.

Thus, current methods of website design may require extensive effort and provide limited options for the website designer, causing many small businesses trying to build their own websites to struggle with coming up with the right content to put on their website. Website development software companies and/or web hosts may present a website operator with website design software, possibly comprising an interface allowing users to choose many categories to narrow down the industry associated with their website, then may direct the user to options that suggest templates. These templates may or may not fall into a category for the identified industry. To complete the website design, website designers must look through website themes, make a selection, and customize the selected website theme to match the desired website design. However, many of these small companies may not know what items are relevant to share versus not share.

Therefore, optimal means for designing a website, including the disclosed invention, may comprise systems and methods including website designs and marketing strategies that can be generated and customized based on data received via software running on a user's mobile device, thereby reducing the need to look through website themes and customize them, since the data to automatically generate the website is received in the normal course of the user's business.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Figure 2:
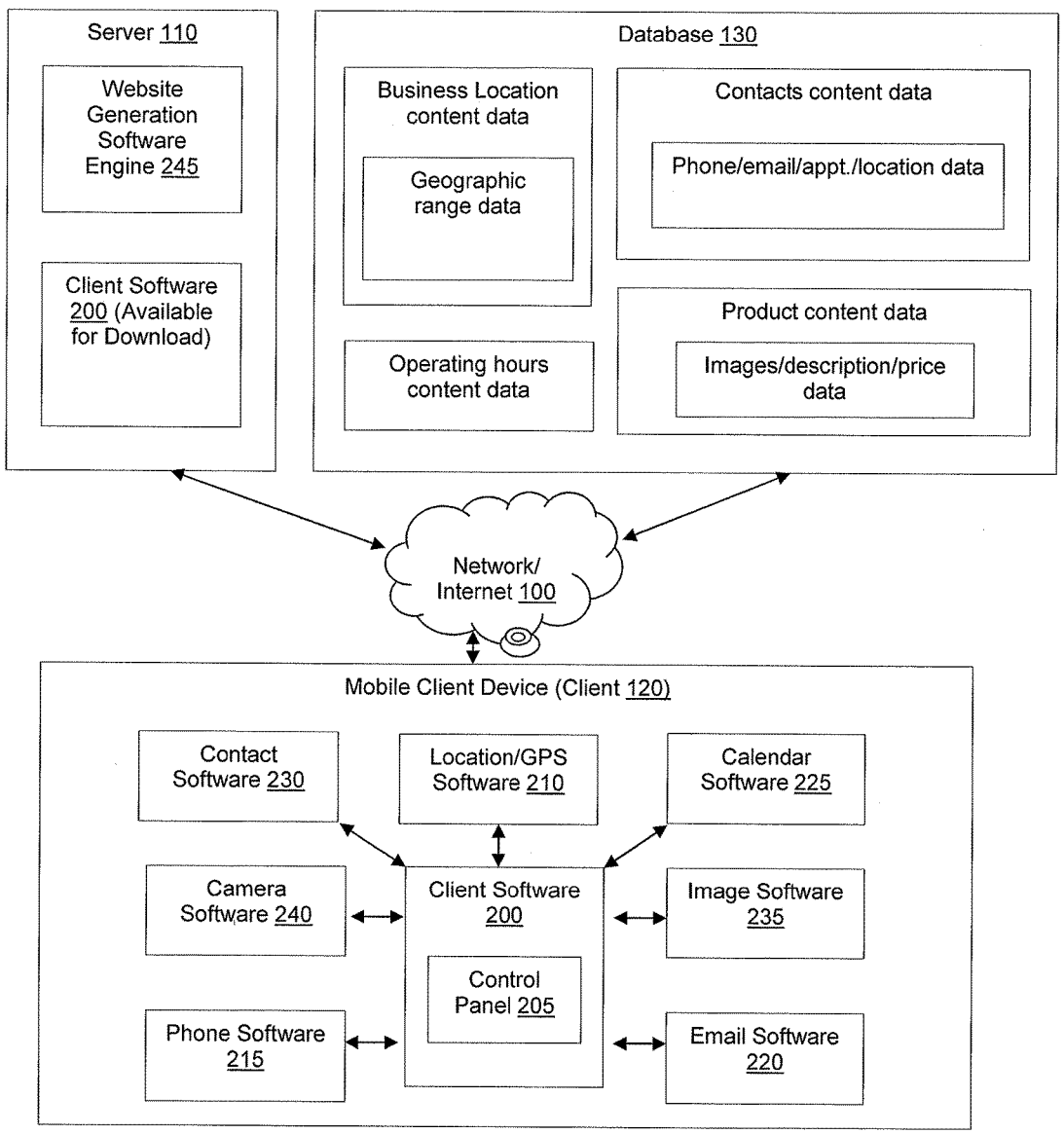
FIG. 2 illustrates a more detailed possible system for generating and customizing a website and recommending marketing strategies according to data received by a mobile device.

FIG. 2 shows a more detailed example embodiment of an environment for the systems, and for accomplishing the method steps, disclosed herein. As non-limiting examples, all disclosed software modules may run on one or more server(s) 110 and/or one or more clients 120 and may include one or more user interfaces generated by the server(s) 110 and transmitted to and displayed on the client(s) 120. The user interface(s) may be configured to receive input from the user and transmit this input to the server(s) 110 for the administration and execution of the software, using data in data storage 130 associated with the software modules. Thus, the disclosed system may be configured to execute any or all of the method steps disclosed herein.

Figure 3:
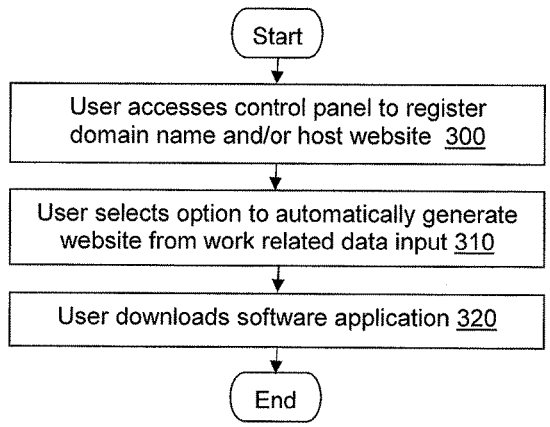
FIG. 3 illustrates a flow diagram for generating and customizing a website and recommending marketing strategies according to data received by a mobile device.
Figure 4:
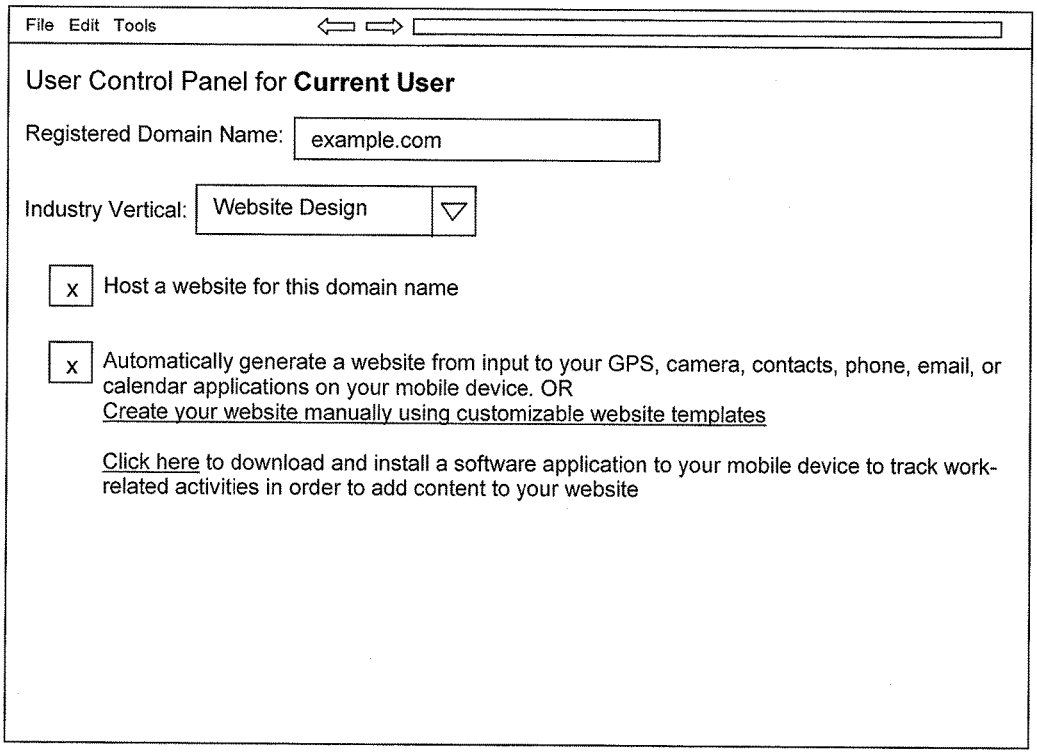
FIG. 4 is an example embodiment of a user interface used in generating and customizing a website and recommending marketing strategies according to data received by a mobile device.

As seen in FIGS. 3-4, a user may access a control panel for registering a domain name and/or hosting a website (Step 300). As seen in the example control panel in FIG. 4, the control panel may display options to either manually develop a website or to have a website automatically generated based on business-related activities tracked on a user's mobile client device 120 (e.g., cell phone, tablet, laptop, etc.) over a period of time (Step 310). As seen in FIG. 4, the control panel may also include options for a user to select a specific industry for the website.

Figures 5, 6:
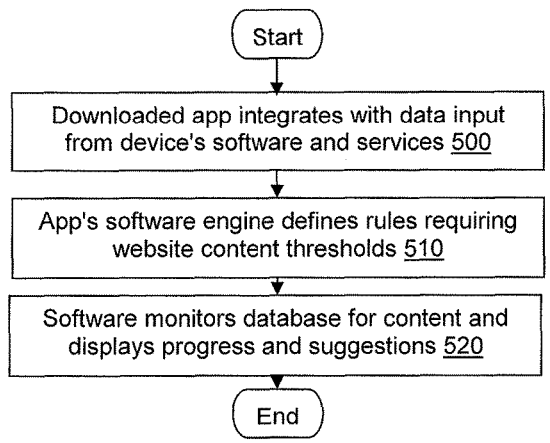
FIG. 5 illustrates a flow diagram for generating and customizing a website and recommending marketing strategies according to data received by a mobile device.
FIG. 6 is an example embodiment of a user interface used in generating and customizing a website and recommending marketing strategies according to data received by a mobile device.

As seen in FIGS. 3-5, the control panel for registering a domain name and/or hosting a website may be rendered on server(s) 110 and transmitted to client 120 for display, and may provide a link for a user to download, install, and run a client software application 200 on the mobile client device 120 (Step 320), which may work in conjunction with database 130 and/or one or more software modules running on server(s) 110 to accomplish the disclosed steps. The client software 200 may include a front end control panel 205, where various user notifications may be displayed, and where user input may be received to configure the disclosed system.

The downloaded software may also include a software backend, including all calculations, algorithms, etc. that are not visible to the user. As seen in the block diagram of the disclosed system in FIG. 2, the installation of the downloaded software may provide the software access to each of the other software applications on the mobile computing device, giving the application deeply integrated access to all incoming data from all of the mobile device's software or services that identify a user's location 210, phone 215, email 220, calendar 225, contacts 230, images/graphics 235, camera 240, video, audio or any other data signals input to the user's mobile device (Step 500), which will be used by the automatic website generation software 245 to generate the website content from the incoming data related to the user's work-related activities.

As seen in FIG. 2, the client software 200 may receive data from any or all software installed on the mobile computing device. To accomplish this, the client software 200 may provide a user interface requesting access to a list of currently installed applications and receive user permission to access each of these applications 210-240. The software may include a series of sensors integrated into each of the existing software modules, giving the client software 200 access any existing data, or data received while the software is in work mode, described below.

By way of example, the user may approve access of the client software 200 to the device's phone software 215 and user contacts software 230. The client software 200 may include sensors that alert the algorithms within the client software 200 when an incoming phone call is received. The phone software 215 may be configured to access the user contact software 230 in order to display a name associated with the incoming phone number. The client software 200 may include sensors that intercept the request for the user's contact information associated with the phone call, and may incorporate this data into any algorithms executed by the client software 200.

In another example, the user may receive an email from an email software 220 running on the mobile client device 120. The sensors within the client software 200 may detect the incoming email, and may be further configured to parse the text content of the email, as well as determine if the email includes an attachment in an image format. The client software 200 may use this incoming data its internal algorithms for generating and storing data records related to website product content, as described below. In some embodiments, the client software 200, and/or software running on server(s) 110 may be configured to identify, within the email content or subject line, references to a product. In these embodiments, the client software 200 and/or software running on server(s) 110 may store both the image and the text content of the email as a product image and product description.

In another example, the calendar software 225 may be configured to display a notification prior to a scheduled appointment (e.g., a 15-minute alert). The sensors within the client software 200 may detect the generated notification/alert and may be configured to access the data for the calendar appointment to determine the time, location and contact involved with the calendar appointment. In embodiments described below, the client software 200 and/or software running on server(s) 110 may be configured to cross reference the data within the calendar appointment. For example, if the appointment takes place at a specific location, sensors in the client software 200 may determine, via integration with the location/GPS software 210, whether the user traveled to the location reflected in the calendar appointment data at the appropriate time. Similarly, while at the identified location, sensors in the client software 200 may determine, via integration with the camera software 240, that a picture was taken at the location during the appointment. In some embodiments described below, the client software 200 and/or software running on server(s) 110 may be used as detected incoming data to generate and store data records related to the website content.

The software running on the mobile device and/or server(s) 110 may comprise algorithm rules that determine how to process the data received from the software applications 210-240 running on the mobile client device 120. The algorithm rules may define behaviors for the client software 200 and/or the software running on server(s) 110. The rules may further define the parameters in which these behaviors take place. The rules may be generated in a variety of ways. For example, a programmer may design the client software 200 or server software in such a way that the rules are reflected within the source code of the software. A system administrator may also access a control panel and be prompted to enter specific rules and/or parameters for rules within the system. As described below, these rules may dynamically change over time to identify the incoming signal data and improve the accuracy of the data stored in association with them. At least some of the rules may therefore be stored in data storage 130 to be accessed, applied and updated by the client or server software.

Beginning with a simple example, the system may include a rule that, for each software 210-240 running on the mobile client device 120 for which the client software 200 has been integrated, the incoming data detected by the sensors from this software 210-240 should be processed and stored in data storage 130. This example may be reflected in the following pseudo code:

```
bool detectedDataFromRunningSoftware = false;
detectIncomingDataFromRunningSoftware( );
```

```
if(detectedDataFromRunningSoftware==true){
    processDetectedIncomingData( );
    storeDetectedIncomingData( );
} else {
    detectIncomingDataFromRunningSoftware( );
} // end if
```

As implied by the pseudo code above, the data received by the client software 200 from the other software applications running on the mobile computing device 210-240 may be stored in data storage 130. Each incoming data from the additional software applications 210-240, and detected by the sensors within the client software 200 may be stored as a data record comprising multiple data fields defining the incoming data. In some embodiments of the disclosed system, the downloaded software may work in conjunction with one or more software modules running on server(s) 110 to process and store the received data, as well as existing data already stored on the mobile client device 120 (e.g., existing contact data) when the software is installed.

The rules may also include a defined threshold amount used to determine if the amount of data received from the additional software applications running on the mobile client device 120 is enough to generate the required website content for the automatically generated website.

This threshold website content amount may be determined according to one or more website categories defined within the algorithm rules. Using the examples in FIG. 6 for a generic business website, these categories may include: a business address to be displayed on the website identifying a physical address for the business; hours of operation informing website visitors when the business is open; business contacts used to develop marketing strategies (explained in more detail below); a product catalog allowing website visitors to view details about available products; and customer testimonials providing review functionality so potential customers are more familiar with the website and products available.

For each of these categories, the software rules may further define a quantity of elements and/or stored data records within a particular category required to effectively present the content in that category for a business website. For example, visitors to a business website will likely expect to find a means to locate a brick and mortar storefront for the business, and may further expect a business address to be displayed on the website in the event they want to meet face-to-face with the business owner or employees. The algorithm rules may therefore define a quantity threshold of at least one business address that must be received by the mobile client device 120 and stored as content in data storage 130 before the website can be automatically created. The following pseudo code reflects one possibility of how threshold and algorithm rules for the required business website address may be expressed:

```
int requiredBusinessAddresses = 1;
int receivedBusinessAddresses = 1;
if(requiredBusinessAddresses<receivedBusinessAddresses){
    presentUserRecommendationsToAddBusinessAddresses( );
} else {
    displayBusinessAddressRequirementAsComplete( );
} // end if
```

In a related category, visitors to the business website will likely expect to find website content describing the business' hours of operation. The algorithm rules may therefore define a quantity threshold of at least one business address that must be received by the mobile client device 120 and stored as content in data storage 130 before the website can be automatically created. The following pseudo code reflects one possibility of how threshold and algorithm rules for the required hours of operation may be expressed:

```
int requiredBusinessHours = 1;
int receivedBusinessHours = 1;
if(requiredBusinessHours<receivedBusinessAddresses){
    presentUserRecommendationsToAddBusinessHours( );
} else {
    displayBusinessHoursRequirementAsComplete( );
} // end if
```

In a third example category, visitors to the business website will likely expect to find website content describing a list of products or services available to the user. The algorithm rules may therefore define a quantity threshold of a particular amount of descriptions, prices and/or images related to products or services, possibly determined by industry, that must be received by the mobile client device 120 and stored as content in data storage 130 before the website can be automatically created. The following pseudo code reflects one possibility of how threshold and algorithm rules for the required products or services may be expressed:

```
int requiredProductsData = 3;
int receivedProductData = 2;
if(requiredProductData<receivedProductData){
    presentUserRecommendationsToAddProductData( );
} else {
    displayProductDataRequirementAsComplete( );
} // end if
```

As seen in FIG. 6, the software may generate a user interface to show the user which categories of content are needed, possibly for the user's identified industry. To generate this interface, the software may compare the threshold amount of data within the category with a number of data records for that category of content currently stored in a database (e.g., for a threshold requirement of at least one business address, is at least on data record for the business address content category stored in the database?). The number of data records in the database associated with a particular content category may be determined via a query to the database. The software may then determine if the amount of stored content data exceeds the amount required by the rules.

Using this comparison, the software may generate a percentage currently achieved as compared to a percentage required by the rules. Using the example code above, the rules require at least one business address and at least one entry for hours of operation. In the example code above, the software has determined that 1 of each has been received. Therefore the percentage of received data compared to the threshold required by the rules is 100%. In the third example, at least three entries of product-related data are required to automatically generate the website, but only two such entries have been received. The software may determine the percentage by dividing the total number of product data entries received (2) by the total number of product data entries required (3). In this example, the mobile computing device has received 66.6% of the required data entries to automatically generate the product-related content for the automatically generated website. The software may then monitor the database for content and display the user's progress towards completion of the automatically generated website, as well as generate suggestions on how to achieve this goal (Step 520)

Figure 7:
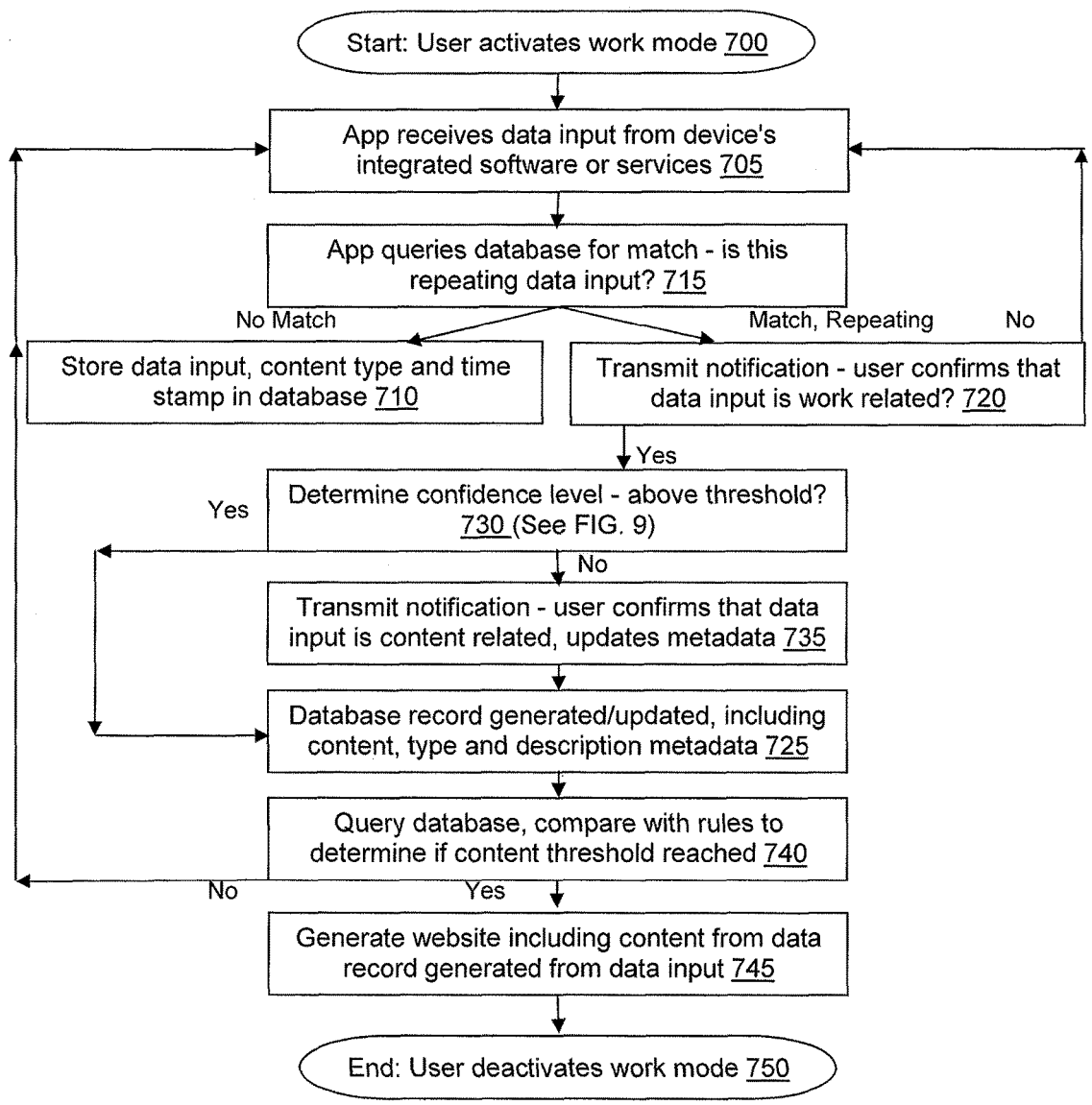
FIG. 7 illustrates a flow diagram for generating and customizing a website and recommending marketing strategies according to data received by a mobile device.

FIG. 7 is a flow chart demonstrating a high-level algorithm for automatically generating a website from the input data received by the client software 200 via sensors detecting the data input from each of the software applications 210-240 running on a user's mobile client device 120. Because the focus of the disclosed invention in this example flowchart is to automatically build a website based on only business-related input data received by the additional client software 210-240, the client software's control panel 205 may include a button or other control panel element for a user to enable and disable a work mode (Step 700), a time period during which the client software 200 identifies and stores all structured and unstructured business-related input data received by the mobile client device 120 (Step 705).

To better manage the structured and unstructured data received by the client software 200 during work mode, the client software 200 may use the incoming data to learn user patterns over time. As the incoming data is received by the client software 120 from each of the software applications during work mode, each new input data may be stored as a data record in data storage and tagged with additional metadata defining the data received from each of the software applications 210-240. The tags and/or metadata may comprise data fields within the generated data record for the incoming data. Each data record may also include a timestamp indicating when the incoming signal data was received.

For example, a location/GPS software 210 running on the mobile client device 120 may receive and/or generate data indicating that the device has moved from its current location to a new location while work mode is activated. For example, in FIG. 8, the location/GPS software 210 may determine that a user has traveled from their home to the address 123 Business Drive. The sensors in the client software 200 integrated with the location/GPS software 210 may identify the incoming data during work mode and generate the following data records (Step 710) comprising the following data fields:

| Time | Start Location | End Location | Arrival Time | Duration |
|---|---|---|---|---|
| 7:45 | 321 Home Dr. | 123 Business Drive | 7:57 | 4.5 Hours |
| 12:26 | 123 Business Drive | 234 Lunch Drive | 12:34 | .5 Hours |
| 13:03 | 234 Lunch Drive | 123 Business Drive | 13:13 | 3.75 Hours |
| 17:05 | 123 Business Drive | 321 Home Drive | 17:12 | 3.75 Hours |

Several different approaches may be used to determine the user's workplace and hours of operation by applying the rules and other algorithms to the data stored in the data records. In one example approach, the client software 200 may access a contact list software 230 running on the mobile client device 120. The client software 200 may cross-reference the data in the contact software 230 with the stored GPS data records to determine if any of the contact data includes the identified location(s). If so, the client software 200 may parse keywords within the contacts to determine if a contact is a candidate for a business-related address, which may include words such as "business," "work," "company,"

etc. If so, the software rules may determine that repeated GPS entries within the data records cross reference to work related contacts in the contact software.

Identification of repetitions in data may be another important factor in determining the user's workplace and hours of operation, as well as all other input received by the client software 200 from each of the other software applications 210-240 running on the mobile client device 120.

Using the algorithms defined in the software rules, the client software 200 may monitor the input data over time and compare it to stored data records to identify repetitions of data inputs (Step 715). The software rules may allow for variations in time or distance, which may be defined within the rules, monitored and updated accordingly by a system administrator, and/or learned over time through machine learning. Continuing the example above, the software may receive data from the GPS software showing that the user arrived at 123 Business Drive on a first morning at 7:57 AM, and may generate the appropriate data record. The client software 200 may then receive a second data from the location/GPS software 210 showing that the user arrived at 123 Business Drive the next morning at 8:03 AM and generate a second data record, and so on. The software may compare each subsequent stored record and identify a repetition of similar stored data (e.g., approximate same location at approximately the same time each day—Step 715).

Although the repetitions in the data records may not reflect identical time and location data, the software may be configured to adjust for data that is similar. In the example above, the first morning arrival at 123 Business Drive was 7:57 AM and the arrival the second morning was at 8:03 AM, a difference of 6 minutes. The rules may therefore include instructions to the client software 200 so that variations of 10 minutes within suspected repetitions, for example, may be identified as repetitions. Similarly, the client software 200 may be configured to adjust for variations in location. For example, if the user were to go to their car multiple times during the day, the rules may adjust for the user moving within a certain radius of the suspected business address and still identify the location as a repeating destination.

Duration of the amount of time spent at a particular location may also be an important factor in determining which logged and stored locations may be possible business related locations. In the example above, the user spends a total of 8.25 hours at 123 Business Drive in two discrete blocks of 4.5 hours and 3.75 hours respectively, which constitutes a majority of time between 8 AM and 5 PM. The rules may therefore include instructions that if a user spends significant blocks of time at a particular location in business mode, that location may be identified as the user's place of business. These rules may avoid trying to log a situation where the user visits a location each morning (e.g. a fast food breakfast restaurant or coffee shop), but is only there for a few minutes of the day.

In some embodiments, the algorithm rules may define a threshold amount of repetitions after which to take certain action. In the example shown in FIG. 8, the software may determine that if the repetition occurs five times Monday through Friday (adjusting for any variations in the rules), that the software should generate and display a notification, possibly displayed on the control panel as in FIG. 8, requesting confirmation that the location signal data containing common data with the data records stored in the database 130 during work mode is a business-related data input (Step 720).

If the user receives the request to confirm that the incoming data is a repetition and/or business-related, but does not confirm that the incoming data is repeated and/or business-related (Step 720), the software may start over, awaiting and receiving the next incoming data (Step 705). However, if the user confirms that the incoming data is repeated and/or work related (Step 720), the software may attempt to automatically categorize, tag, generate and/or update a database record (Step 725). This database record may include all necessary website content for automatically generating the website from the input signal data, as well as all annotations, metadata and/or tags stored within data fields in the data record required to categorize and define the data or website content. For example, the metadata and/or tags within the data fields of the data record may define or describe the type of incoming data received and/or the type of website content to be created.

In order to automatically generate the website content-related data and store it as data records in data storage 130, the rules may define a threshold for a confidence level, which must be exceeded before the software will automatically generate the website content record data from the incoming data (Step 730). The steps to determine whether the confidence level exceeds the requested confidence level threshold are described in greater detail below in association with FIGS. 9 and 10.

If the confidence level does not exceed the requested threshold to automatically generate the website content data record from the incoming data, the system may be configured to generate and transmit a notification to the user requesting confirmation that the incoming data is related to the content of the website (Step 735). If the user confirms that the incoming data is related to the website content, the user may also provide the annotations, metadata and/or tags defining the incoming data and/or website content to be stored in the content related data record (Step 735).

Continuing the example above from FIG. 8, the rules may define five repetitions as a trigger for requesting the user confirmation. On the fifth instance of the user arriving at the first destination at or near 8 AM and departing for the second destination at or near 5 PM, and determining that the user was at this location for a majority of the time that work mode was activated, the algorithm rules may cause the software to generate a notification displayed to the user requesting confirmation, according to the appropriate rule, that the user's work schedule is between 8 AM and 5 PM Monday through Friday. On receiving confirmation of this information, the algorithm rules may, for example, store a content data record with annotations, metadata and/or tags defining, for use on the website, the user's address as 123 Business Street, and the user's business hours as Monday-Friday 8 AM to 5 PM.

In some embodiments, this data may also be used to automatically enable the work mode described above for all incoming data received at that location during the designated hours and days. In some embodiments, the business address may simply be determined by an appropriate entry in the user's contacts software, where, as the user's business address is updated in the user's contacts, the business address for the website may also be automatically updated.

As seen in FIGS. 6 and 8, the algorithm rules may define multiple categories of content required for the automatically generated website. For example, in FIG. 6, the rules may define categories for business address, hours of operation, business contacts, product catalog and testimonials. For each of these categories, the rules may define a threshold amount of required content that must be stored within data records in the database before the website is automatically generated. Continuing the example above, in FIG. 8, the required business address and availability hours content threshold for these categories may be fulfilled via the user's confirmation that the incoming location data represents business address and availability hours for the website. In some embodiments, specialized categories may be defined for the industry identified by the user. For example, a restaurant-related website may require content for categories of the restaurant's location, menu items, lunch and dinner hours, delivery options, etc.

The software may monitor the amount of content data stored as data records within the database 130 for each content category for the website (Step 740), and the control panel may display the current status (i.e., percentage of data currently stored compared to the required threshold amount) of each content category, and/or any outstanding category requirements, as seen in FIGS. 6 and 8. The software may also use the status of deficient categories, as well as identified business related data to display notifications prompting the user to gather more information, possibly using control panel user inputs such as those seen in FIG. 6. Additional suggestions may include taking more pictures at identified job sites, collecting testimonials from customers, etc.

If the software queries the database 130 and determines that all threshold amounts for each category of the required content have been reached for all categories (Step 740), the software may automatically generate (i.e., algorithmically create) a website for the user including all content stored in data storage for each of the website content categories within the business related website (step 745). In some embodiments, the software may confirm the final product with the user before publishing the website content.

Figure 9:
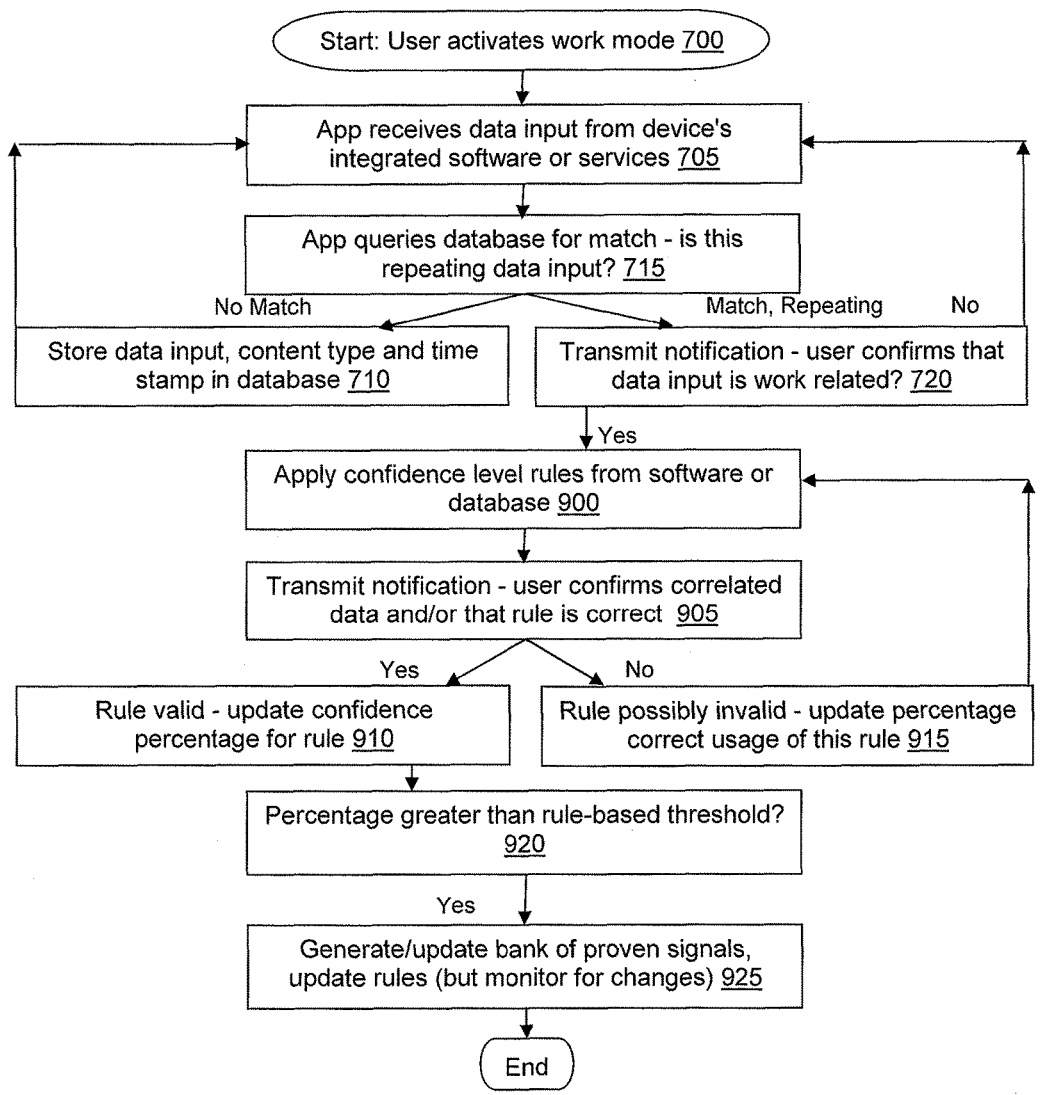
FIG. 9 illustrates a flow diagram for generating and customizing a website and recommending marketing strategies according to data received by a mobile device.
Figure 10:
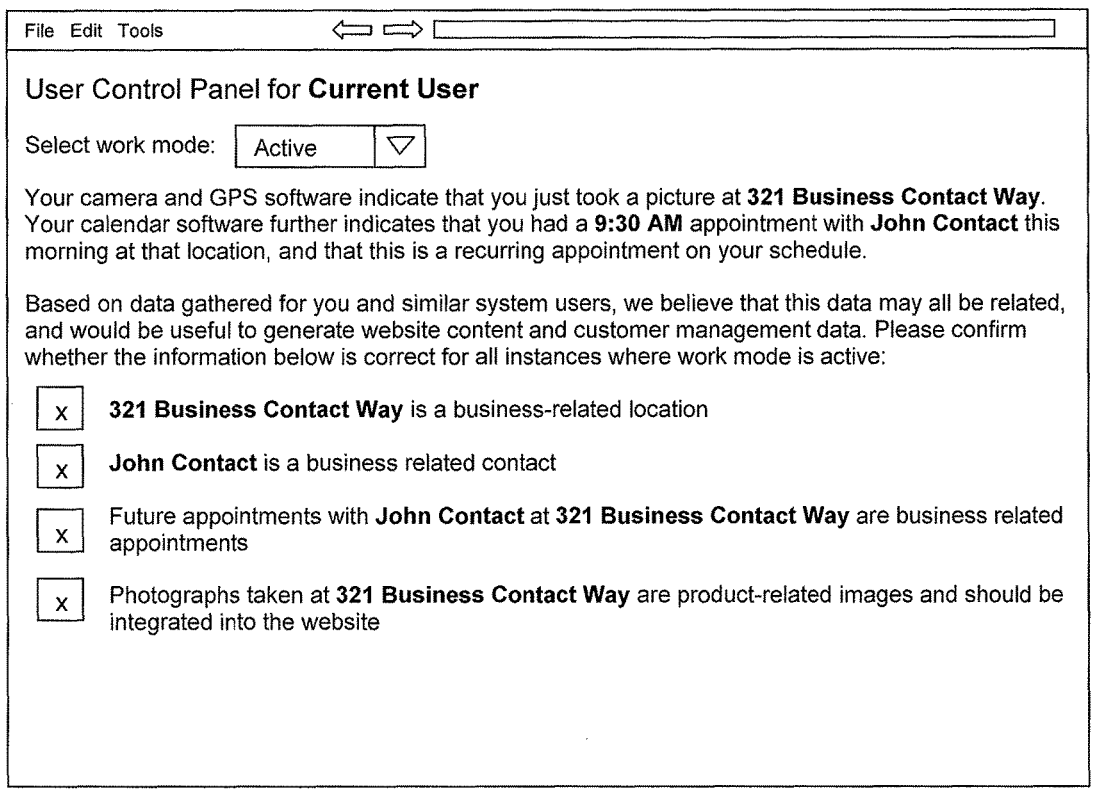
FIG. 10 is an example embodiment of a user interface used in generating and customizing a website and recommending marketing strategies according to data received by a mobile device.
Figure 11:
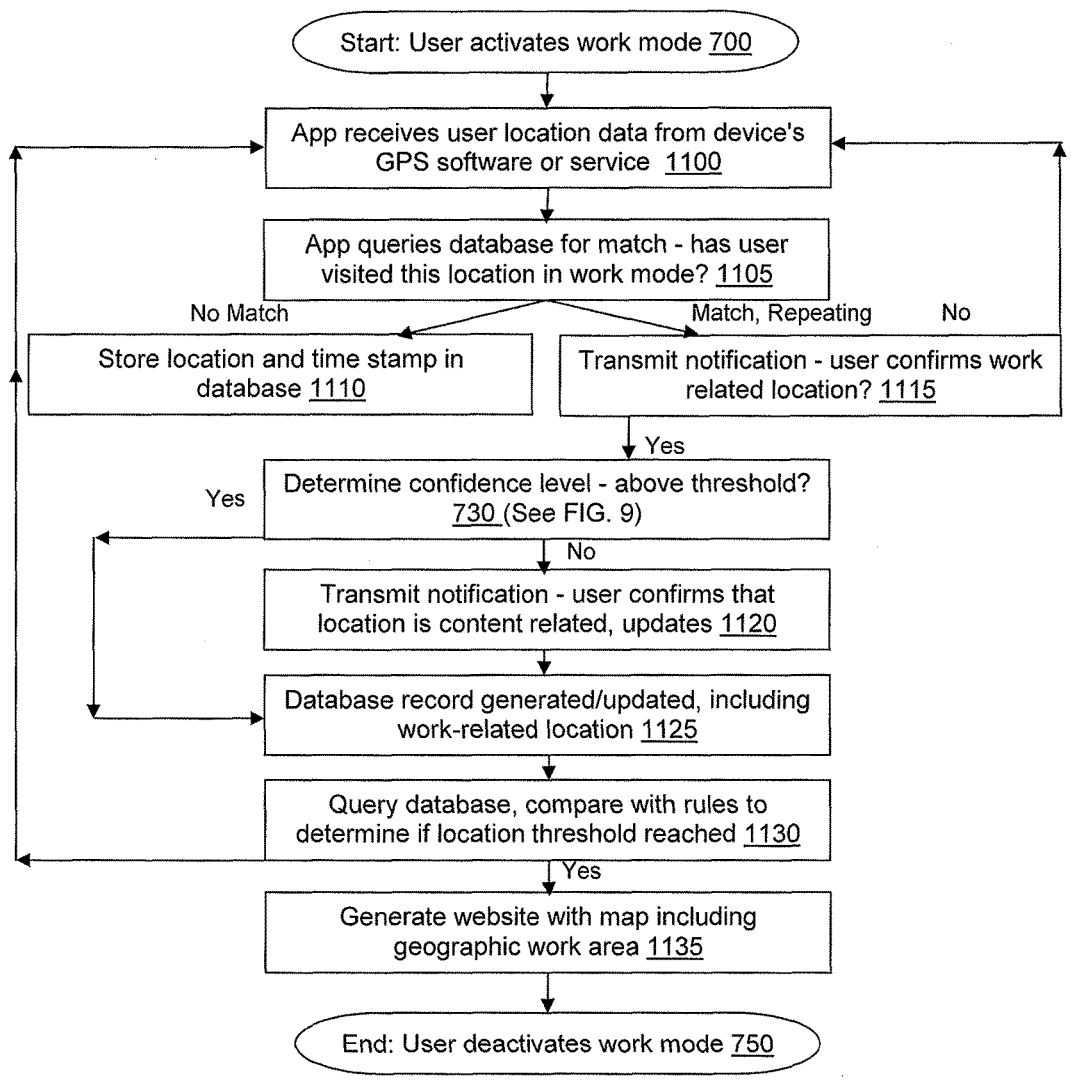
FIG. 11 illustrates a flow diagram for generating and customizing a website and recommending marketing strategies according to data received by a mobile device.

Returning to step 730 in FIG. 7, FIGS. 9-10 provide a flowchart and example control panel more clearly defining the process of determining a confidence level for the algorithmic software rules and correlations between existing website content data records, possibly in different content categories. As noted above, the rules may include rules to automatically generate data records from the incoming data from the computing device. These data records may specifically define the content for multiple content categories where the content is to be displayed within the automatically generated website. The rules may include a subset of multiple confidence level rules defining the confidence in correlations between the input signal data and/or one or more stored data records associated with different categories of website content, as described below. The confidence level rules may either be integrated into the software's algorithms and code and/or may be defined and stored in data storage 130 so that the rules may be dynamically updated as needed. The confidence level rules may define a threshold required for a confidence level in the rule and/or the correlation. If the system determines that the confidence level for a given rule or correlation is above the defined threshold, the rule or correlation may be added to a database of proven input data that does not require user verification to automatically generate the data records defining the website content for one or more categories.

As seen in FIG. 9, the notification may request and receive confirmation from the user that the incoming data from the computing device is a work-related data signal input (Step 720). Once the incoming data is confirmed as business related, the system may apply the confidence level rules to the confirmed incoming data (Step 900).

In the embodiments and examples above describing FIGS. 7-8, the incoming data was compared with the stored content data records within a single content category (e.g., business address or business hours of operation) in order to identify possible common incoming data indicating repetitious data. The embodiments in FIGS. 9 and 10 are not limited to such common and possible repetitive incoming data within a single content category. In FIGS. 9 and 10, the confidence level rules may also identify several correlations among incoming data and existing website content data records associated with diverse content classifications.

For example, in FIG. 10, a user may have scheduled an appointment on a calendar software 225 with a contact within a contact software 230, both of which may be running on the mobile client device 120. The appointment may include details such as the contact's name, address, phone number, email address, etc. A location/GPS software 210 running on the mobile client device 120 may confirm that the user has traveled to the contact's address at the appropriate time, and may identify any phone calls or emails received (via phone software 215 or email software 220) from the contact during or close to the scheduled meeting. While at the location, the camera software 240 may detect that the user took a photograph and/or received an email from the contact with an image attached. Each of these incoming data may be processed and stored with metadata or tags identifying them as different website content categories.

The algorithm rules within the system may therefore include confidence level rules, either input by a programmer/system administrator or learned over time through machine learning, and stored in data storage 130. These confidence level rules may define the correlation between common and diverse content categories or other common data between incoming data and/or stored website content data records, and may determine the confidence level for the system to automatically generate content definitions within the data records for repetitive incoming data sharing certain common characteristics (Step 730).

In accordance with these rules, the system may transmit a request to the user confirming the proposed correlated data, and therefore that the rule that created the correlation was correct (Step 905). In FIG. 10, the rules may identify triggers for requesting confirmation from the user of the correlation and of the confidence level for the rule. For example, in FIG. 10, a rule may state that if the GPS input detects a user at a location listed in a calendar appointment during working hours, notifications should be sent to the user requesting confirmation that the location is a business location and that the contact is a business contact (and therefore that a rule correlating the data in these categories is correct). Another rule may state that if the appointment is a recurring appointment, a request should be sent confirming that all future appointments with that contact that include the same parameters are business-related appointments. Another rule may state that if photographs are taken at that location, the user should confirm that they are business and/or product related photographs, etc.

A running tally of all total responses to each of the correlation/confidence level rule confirmation requests may be tallied, possibly being stored in data storage. For each positive response/confirmation of the rule, both the total number of responses received and the positive responses received may be increased by one (Step 910). However, if the user does not confirm the correlation and/or the rule, only the total number of responses is increased by one (Step 915). A percentage of confirmations above a defined threshold can therefore be calculated for the confidence level of each of the correlations and/or confidence level rules by dividing the total number of positive responses confirming the rule by the total number of responses received related to that rule.

The percentage may be compared with a previously defined threshold determining whether a rule and/or correlated data should be added to a database of proven input data. This proven input data may be applied within the algorithms of the software modules and/or stored in data storage 130. The defined required threshold percentage that must be exceeded may be defined within the system by a system administrator, or may be learned by the system over time using machine learning. If the percentage is greater than the threshold percentage (Step 920), the correlated data and/or the rule may be added as a data record to a database of proven signal data (Step 925). In some embodiments, the database of proven signals may comprise a subset of database/data storage 130.

As the confidence level is determined, in step 730, the system may query the database of proven signal data to determine if the input signal data and/or the rules defining the input signal data/correlated data are defined in the database of proven signal data (Step 730). If the appropriate data records exist within the database of proven signal data, the software may automatically generate the appropriate data records, content data and/or metadata tags defining the content to be added to the automatically generated website. The database of proven signal data may apply at both a specific user level, as well as being applicable to all users of the system.

Using the example of the business' hours of operation above, the confidence level rules may include a rule that a business' hours of operation are Monday-Friday from 8 AM to 5 PM. For each new user in this example, the client software 200 may display a user confirmation to test the confidence level rule, which may be reflected in the following pseudo code:

```
string businessHours = "M-F 8 AM-5 PM";
int requiredPercentage = 98;
if(newClientSoftwareInstall){
    presentUserConfirmationOfBusinessHours( );
} // end if
if(userConfirmsBusinessHours){
    updateConfidencePercentage( );
} // end if
if(confirmedPercenage>requiredPercentage){
    autoGenerateDataBusinessHoursRecord( );
} // end if
```

The client software 200 may add the user confirmation in this example to the total to determine if the number of positive responses by the individual user or all users is greater than the threshold percentage, which in this example if 98%. In other words, 98% of the users would have to have responded positively that their hours of operation are from 8 AM to 5 PM Monday through Friday before the confidence level for the rule reaches the 98% confidence required to automatically generate the hours of operation content data records for the website.

In this example, if 98% of the users confirm that their hours of operation are from 8 AM to 5 PM, the following content data records would be automatically generated for each user that downloads and installs the client software 200:

| Content | Day | Store Open | Store Closed |
| --- | --- | --- | --- |
| Hours of Operation | Monday | 8:00:00 | 17:00:00 |
| Hours of Operation | Tuesday | 8:00:00 | 17:00:00 |
| Hours of Operation | Wednesday | 8:00:00 | 17:00:00 |
| Hours of Operation | Thursday | 8:00:00 | 17:00:00 |
| Hours of Operation | Friday | 8:00:00 | 17:00:00 |

For each new automatically generated website, the requirement for hours of operation content would therefore be automatically fulfilled, and begin at 100%.

Data within the database of proven signal data may be periodically audited by automatically generating, at random intervals and for random content categories, confirmation notifications sent to the user to confirm that the database of proven signals is still valid. If the user does not confirm any of these proven signals, the database of proven data signal data may be updated accordingly.

FIGS. 11-14 demonstrate specific applications of the general algorithm demonstrated in the flow chart in FIG. 7. Specifically, FIG. 11 demonstrates a specific application of location incoming data via a GPS or other location software 210 running on the mobile client device 120. The software modules may receive location data (Step 1100) and determine if the location has been visited before in work mode by comparing the incoming data with existing data records (Step 1105). If the user has previously visited this location, the user may confirm, via a positive response to the notification, that the location is work related (Step 1115). If the confidence level is not above the confidence rule threshold (Step 730), the user may confirm, via a positive response to the notification, that the location is related to the content for the website, and will be included in a map of work-related locations to be displayed on the website (Step 1120) and may provide any additional details to be updated in the database. The database may then be queried to determine if the threshold level of location data has been exceeded (Step 1130), and if so, website generation software may generate a map portion within the automatically generated website displaying all work locations for the user's business (Step 1135).

In some embodiments, the map portion may comprise a map of the service area for the business the website was created for. For example, a wedding photographer may travel to various destinations during any given business day. The location/GPS software 210 may log all locations visited by the user while the client software 200 is in work mode to determine and cluster the results to determine the vicinity of the areas covered by the wedding photographer. In some embodiments, the user's place of business may be used as a centralized point on the map, and the furthest distance traveled may be used as a radius to determine the area covered by the generated map.

Figure 12:
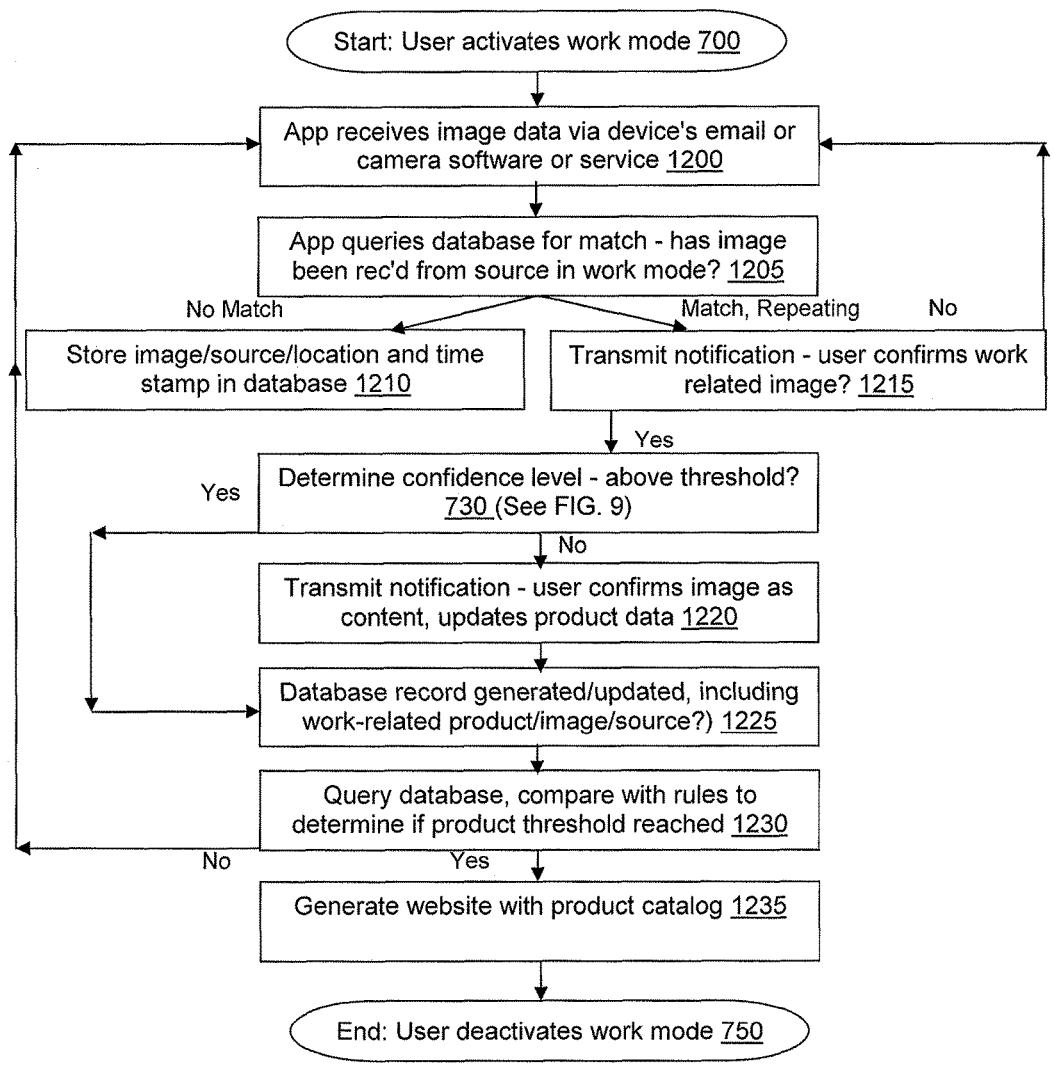
FIG. 12 illustrates a flow diagram for generating and customizing a website and recommending marketing strategies according to data received by a mobile device.

FIGS. 12-13 demonstrates a specific application of incoming image and/or product data via a camera 240 or email 220 software running on the mobile client device 120. The software modules may receive image data (Step 1200) as a picture taken or an attachment to a received email and determine if a previous image has been received from the same source (e.g., camera or email) in work mode by comparing the data signal input with existing data records (Step 1205) The system may identify repeating data records for the image and may send a confirmation notification to the user using techniques analogous to those described in detail above. If the user has previously received an image from this source, the user may confirm, via a positive response to the notification, that the image is work related (Step 1215). If the confidence level is not above the confidence rule threshold (Step 730), the user may confirm, via a positive response to the notification, that the image is related to the content for the website, and will be included in a catalog of products to be displayed on the website (Step 1220). Therefore, as seen in FIG. 13, the user may also provide a product description and price to accompany the image, which may be updated in the database (Step 1225). The database may then be queried to determine if the threshold level of product data has been exceeded (Step 1230), and if so, website generation software may generate a map portion within the automatically generated website displaying all products within the product catalog for the user's business (Step 1235).

In embodiments such as those seen in FIGS. 13-14, the image may be received as incoming data as an attachment to an email received by an email software 220 running on the mobile client device 120. In these embodiments, the email may be received from a confirmed business contact (Step 1400). If the user confirms that the image(s) is related to a product and/or content for the website (Step 1405), the software may automatically store the image, and if applicable, a product description from the email, as content in the database (Step 1410), thereby avoiding the necessity for the user to download the image and copy the product description and insert them into the database.

Figure 15:
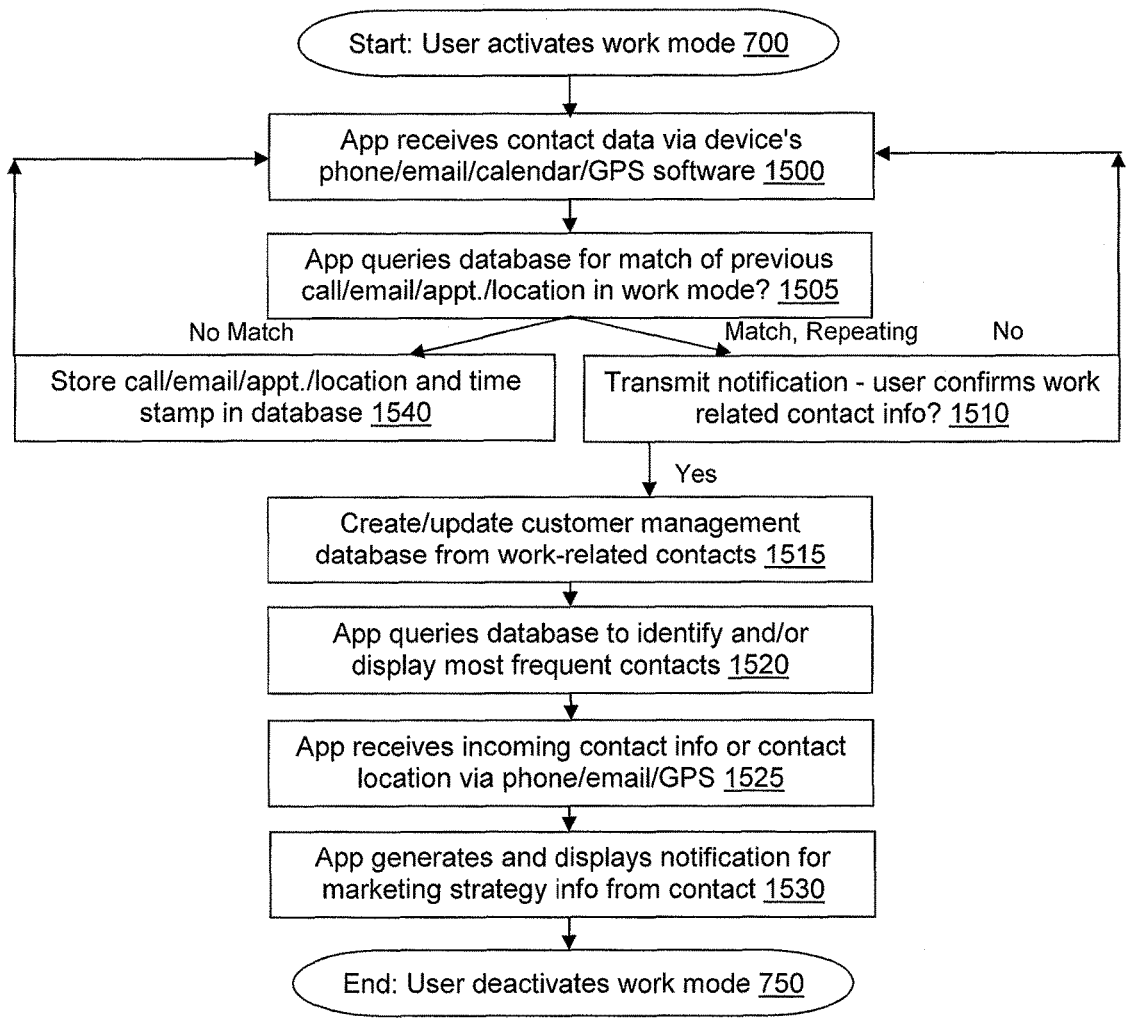
FIG. 15 illustrates a flow diagram for generating and customizing a website and recommending marketing strategies according to data received by a mobile device.

FIG. 15 demonstrates that, in addition to being integral to the previously disclosed steps, incoming contact data may be used to provide a customer database, and to present marketing strategies to system users. FIG. 15 demonstrates a specific application of incoming contact data via a variety of sources. These sources may include an incoming or outgoing phone call or text to or from a contact, an incoming or outgoing email to or from a contact, a calendar appointment with a confirmed contact, a GPS location of a user visiting an address of a confirmed contact, etc. In FIG. 15, the software on a mobile device or server(s) 110 may receive the contact data from any of the sources above via the appropriate software or services 210-240 (Step 1500) and determine if the incoming contact data has previously been received during work mode from the same source by comparing the incoming contact data with existing data records (Step 1505). The system may identify repeating data records for the incoming contact data and may send a confirmation notification to the user using techniques analogous to those described in detail above. If the user has previously received an incoming contact data from this source, the user may confirm, via a positive response to the notification, that the incoming contact data is work related (Step 1510).

Each confirmed work-related contact may be inserted via database query into a customer management database (Step 1515). Furthermore, each confirmed phone call, email, calendar appointment, confirmed user location, etc. for each of the incoming contact data may be logged in this database in association with the contact. The software may then query the database to determine the contacts with the most phone calls, emails, calendar appointments, visits, etc. and may rank the contacts according to the most frequently occurring of these incoming contact data (Step 1520).

As each new phone call, email, calendar appointment and/or user location is received by the software or service 210-240 on the mobile client device 120, the software modules may query the database for all contact data to determine if the contact is one of the highest ranked contacts for the user (Step 1525). If so, the control panel may display a recommendation for a marketing strategy to be employed by the user for the identified contact (Step 1530).

Figure 16:
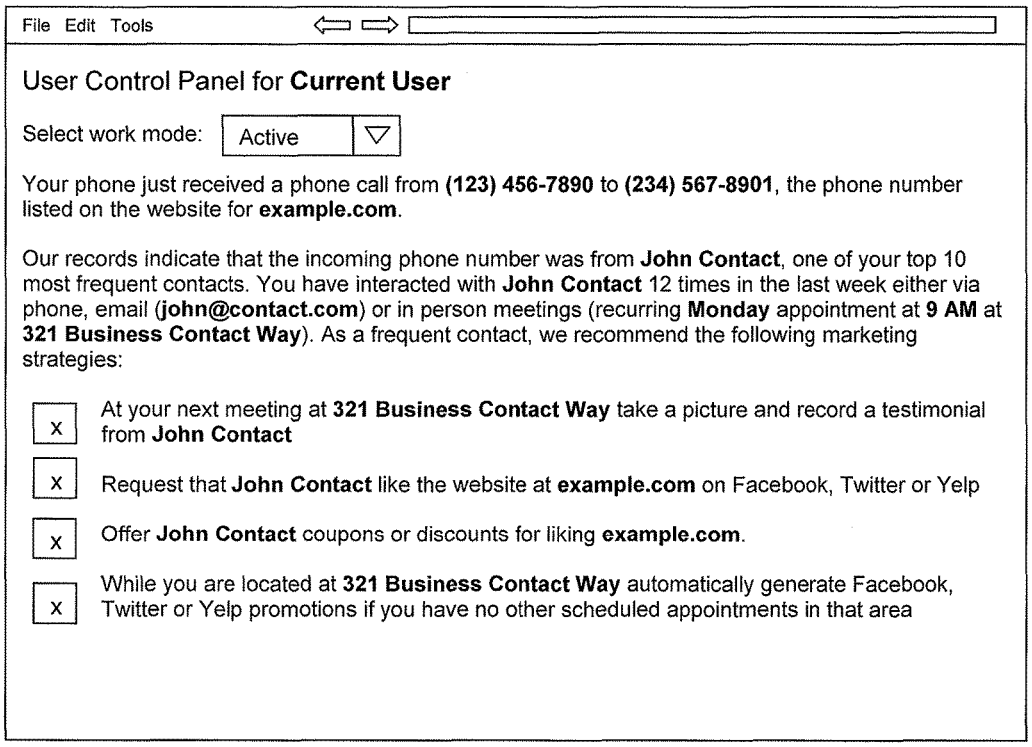
FIG. 16 is an example embodiment of a user interface used in generating and customizing a website and recommending marketing strategies according to data received by a mobile device.

For example, in FIG. 16, the phone software 215 running on the mobile client device 120 may receive an incoming phone call. The incoming phone number may be identified and cross referenced with the device's contact, calendar, GPS or other software 210-240 to identify other instances of the phone number. Using this phone number, the system may identify the contact associated with the phone number (e.g., John Contact in FIG. 16) and additional associated information, such as an email address (john@contact.com), business address (321 Business Contact Way), recurring calendar events including the contact (Monday, 9 AM), etc. As described above, the system may have automatically ranked all contacts in the customer management database according to most frequent occurrences within the database. If the contact for the incoming phone number, email, etc. is one of the most frequent contacts for the user, the system may recommend one or more marketing strategies. In some embodiments, the system may generate and display, on the mobile client device 120, a ranked list of the most frequent contacts and a corresponding list of marketing strategies recommended to the user.

Examples of such marketing strategies may include: receiving an electronic testimonial from the contact to be posted on the website and comprising a photograph received from a camera software 240 and an audio testimonial from an audio recording software on the mobile client device 120; requesting a positive feedback on a social media account for an operator of the mobile client device 120 in exchange for a coupon to be redeemed on the website; or automatically generating a social media promotion within the social media account during a period on a calendar software 225 running on the mobile client device 120 with no appointments.

In some embodiments, in addition to identifying the incoming phone number, the system may identify the phone number dialed, and cross reference the dialed phone number with a phone number listed on the business website. If the phone number on the website changes over time (e.g., the business owner changes cell phone numbers), the dialed phone number may be used as a means of tracking versions of the website. If changes on the website correlate to the changes in the phone number, the operator of the website may use this correlation to determine if the changes to the website were effective. For example, if the website operator was to make changes to the website correlated to the change in phone number, the website operator could track the number of phone calls to that phone number to determine if the changes to the website resulted in more website traffic.

The steps included in the embodiments illustrated and described in relation to FIGS. 1-16 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising:
   a mobile device coupled to a network and running a user location software;
   a database coupled to the network and storing a location-related website content and at least one metadata describing the location-related website content; and
   a server, comprising a custom-designed special-purpose computing device coupled to a network and including at least one processor executing instructions within a memory comprising a specific device logic, which, when executed cause the system to:
      identify, within a first user input from a first graphical user interface (GUI) displayed on the mobile device, a request for:
         a website automatically generated by, and hosted on, the server; and
         a download, over the network and to be run on the mobile device, of an application:
            connected through the network to the server and a database;
            receiving a client input from at least one additional application on the client; and
            accessing a plurality of software rules comprising:
               a first threshold defining a total repetition of website elements required to be received from the client input, for at least one business specific website category; and
               a second threshold defining a total website content, from each of the at least one business specific website category, required to automatically generate the website;
      download, over the network, the application to be installed on the mobile device;
      activate a business-related operating mode for the application, responsive to a second user input from a second GUI indicating that the application should operate in the business-related operating mode;
      receive, from the mobile device via the user location software, a location data defining a location of a user;
      transmit a user interface notification encoding:
         a request for a confirmation that the location data comprises the location-related website content; and
         the at least one metadata;
      receive a transmission encoding the confirmation that the location data comprises the location-related website content;
      insert, into the database, the location data and the metadata;
      identify, using a plurality of repetitions of a website content data being inserted into the database, at least one user pattern over time;
      compare the at least one user pattern with the first threshold;
      responsive to a determination that the first threshold has been met, determine that a quantity of the location-related website content is above a required threshold to generate a map within the website; and
      automatically generate, without user input, the map within the website, the map comprising the location-related website content data.

2. The system of claim 1, wherein the business related operating mode is activated and deactivated by at least one user interface button on a control panel.

3. The system of claim 1, wherein the location data comprises:
   a first location identified as a business address; or
   a plurality of locations identified as business-related locations and defining a geographic business service area;
   a contact data received while the mobile device is operating in the business-related operating mode comprises:
      an incoming or outgoing phone call from a contact;
      an incoming or outgoing email from the contact; or
      at least one audio or video testimonial from the contact;
   a schedule data received while the mobile device is operating in the business-related operating mode comprises at least one calendar event; or
   a product data received while the mobile device is operating in the business-related operating mode comprises:
      at least one image of a product, taken by a camera software or received via the incoming email;
      a description of the product; or
      a price of the product.

4. The system of claim 3, wherein the map within the website comprises a business-related service area, wherein the map identifies a plurality of locations identified by the user location software as having been visited during the business related operating mode.

5. The system of claim 1, wherein the instructions cause the server to:
   query the database for at least one website location content data record;
   determine that the location data shares at least one common data with at least one data field within the at least one website location content data record;
   transmit a notification encoding a request for a confirmation that the location data is a business-related data; and
   receive a transmission encoding the confirmation that the location data is a business-related data.

6. The system of claim 1, wherein the required threshold is defined by a set of algorithmic rules within the instructions, and wherein the required threshold comprises at least one data record defining a content comprising:
   at least one business address;
   a schedule comprising hours of operation;
   at least one product comprising:
      an image of the product;
      a price of the product; and
      a description of the product; or
      at least one review of a business or the at least one product.

7. A system, comprising:
   a mobile device coupled to a network and running at least one camera or email software;
   a database coupled to the network and storing a product-related website content and at least one metadata describing the product-related website content; and
   a server, comprising a custom-designed special-purpose computing device coupled to a network and including at least one processor executing instructions within a memory comprising a specific device logic, which, when executed cause the system to:
      identify, within a first user input from a first graphical user interface (GUI) displayed on the mobile device, a request for:
         a website automatically generated by, and hosted on, the server; and
         a download, over the network and to be run on the mobile device, of an application:
            connected through the network to the server and a database;

receiving a client input from at least one additional application on the client; and
accessing a plurality of software rules comprising:
a first threshold defining a total repetition of website elements required to be received from the client input, for at least one business specific website category; and
a second threshold defining a total website content, from each of the at least one business specific website category, required to automatically generate the website;
download, over the network, the application to be installed on the mobile device;
activate a business-related operating mode for the application, responsive to a second user input from a second GUI indicating that the application should operate in the business-related operating mode;
receive, from the mobile device via the at least one camera or email software, an image or product description data defining a product to be displayed on the website;
transmit a user interface notification encoding:
a request for a confirmation that the image or product description data comprises the product-related website content; and
the at least one metadata;
receive a transmission encoding the confirmation that the image or product description data comprises the product-related website content;
insert, into the database, the image or product description data and the metadata;
identify, using a plurality of repetitions of a website content data being inserted into the database, at least one user pattern over time;
compare the at least one user pattern with the first threshold;
responsive to a determination that the first threshold has been met, determine that a quantity of the product-related website content is above a required threshold to generate a product catalog for the website; and
automatically generate, without user input, the product catalog for the website comprising the website content data.

8. The system of claim 7, wherein the business related operating mode is activated and deactivated by at least one user interface button on a control panel.

9. The system of claim 7, wherein:
a location data received while the mobile device is operating in the business-related operating mode comprises:
a first location identified as a business address; or
a plurality of locations identified as business-related locations and defining a geographic business service area;
a contact data received while the mobile device is operating in the business-related operating mode comprises:
an incoming or outgoing phone call from a contact;
an incoming or outgoing email from the contact; or
at least one audio or video testimonial from the contact;
a schedule data received while the mobile device is operating in the business-related operating mode comprises at least one calendar event; or
the image or product description data comprises:
at least one image of a product, taken by a camera software or received via the incoming email;
a description of the product; or
a price of the product.

10. The system of claim 7, wherein the instructions cause the server to:
query the database for at least one website product content data record;
determine that the location, contact, schedule, image or product description data shares at least one common data with at least one data field within the at least one website product content data record;
transmit a notification encoding a request for a confirmation that the image or product description data is a business-related data; and
receive a transmission encoding the confirmation that the image or product description data is a business-related data.

11. The system of claim 7, wherein the required threshold is defined by a set of algorithmic rules within the instructions, and wherein the required threshold comprises at least one data record defining a content comprising:
at least one business address;
a schedule comprising hours of operation;
at least one product comprising:
an image of the product;
a price of the product; and
a description of the product; or
at least one review of a business or the at least one product.

12. The system of claim 7, wherein the at least one image or product description data is received as an attachment and email content body respectively, and wherein the instructions automatically store the image or product description from the email to at least one website product content data record.

13. A system, comprising:
a mobile device coupled to a network and running at least one user location, cell phone, email, calendar or camera software;
a database coupled to the network and storing:
at least one algorithm rule to automatically generate at least one website content data from a location, contact, schedule, product or image data received from the mobile device, the at least one website content data including a website content, a category for the website content and at least one metadata describing the website content;
a server, comprising a custom-designed special-purpose computing device coupled to a network and including at least one processor executing instructions within a memory comprising a specific device logic, which, when executed cause the system to:
identify, within a first user input from a first graphical user interface (GUI) displayed on the mobile device, a request for:
a website automatically generated by, and hosted on, the server; and
a download, over the network and to be run on the mobile device, of an application:
connected through the network to the server and a database;
receiving a client input from at least one additional application on the client; and
accessing a plurality of software rules comprising:
a first threshold defining a total repetition of website elements required to be received from the client input, for at least one business specific website category; and
a second threshold defining a total website content, from each of the at least one business specific website category, required to automatically generate the website;
download, over the network, the application to be installed on the mobile device;
receive, from the mobile device, the location, contact, schedule, product or image data;
transmit a user interface notification displayed on the mobile device encoding a request for a confirmation that the at least one algorithm rule should be applied to the location, contact, schedule, product or image data;
receive a transmission confirming that the at least one algorithm rule should be applied;
determine that the confirmation exceeds a percentage of a plurality of confirmations above a defined threshold; and
store, within the database, at least one proven signal data record comprising the at least one algorithmic rule.

14. The system of claim 13, wherein the threshold is set by an administrator or learned by machine learning.

15. The system of claim 13, wherein:
the algorithm rule identifies a first content data record comprising a first content category sharing at least one common data with a second content data record comprising a second content category; and
the at least one common data defines a confidence level that the at least one algorithm rule should be applied.

16. The system of claim 15, wherein the first content category and the second content category are selected from a group comprising an appointment, a contact name, a phone number, an email address and a user location.

17. The system of claim 13, wherein the at least one rule data record is audited at regular intervals, wherein an audit is performed by the instructions causing the computing device to transmit an additional confirmation at a regular interval to confirm a continued applicability of the at least one algorithm rule.

* * * * *